United States Patent Office 3,396,224
Patented Aug. 6, 1968

3,396,224
CONTROLLING PHYTOPATHOGENIC FUNGI
ON PLANTS WITH 3-PYRIDYL METHANE
DERIVATIVES
Earle M. Van Heyningen, Indianapolis, Ind., assignor to
Eli Lilly and Company, Indianapolis, Ind., a corporation of Indiana
No Drawing. Filed Sept. 9, 1965, Ser. No. 486,193
8 Claims. (Cl. 424—263)

This invention relates to novel fungicidal compositions and to methods for the use thereof. More especially, this invention concerns novel fungicidal compositions in which a substituted pyridine or an N-oxide thereof is the fungicidally active ingredient.

The compounds of the present invention has been found useful in controlling fung which attack food crops and ornamental plants.

Susceptible fungi which attack food crops include *Erysiphe polygoni*, the causative organism of bean powdery mildew; and *Erysiphe cichoracearum*, the causative organism of squash powdery mildew; as well as *Phytophthora infestans*, the causative organism of tomato and potato late blight; *Colletotrichum lagenarium*, the causative organism of cucumber anthracnose; and *Uromyces phaseoli*, the causative organism of bean rust.

Among the susceptible fungi which affect ornamental plants is *Sphaerotheca pannosa* var. *rosae*, the causative organism of powdery mildew of rose, and *Erysiphe graminis*, the causative organism of powdery mildew of grass.

The novel fungicidal compositions of this invention also possess interesting bactericidal activity, being effective against *Xanthomonas phaseoli* var. *sojensis*.

It is an object of this invention to provide compositions which are toxic to certain fungi affecting food crops and ornamental plants. A further object is to provide novel compositions and processes which serve to control such fungi.

In fulfillment of the above and other objects, this invention provides a novel process which comprises applying to plant foliage a fungicidal amount of one or more substituted pyridines or pyridine-N-oxides of the classes represented by the following formulas:

I and Ia wherein
X is hydroxyl, halogen, amino, acetoxy, lower alkoxy or lower alkyl mercapto;
$R^1$ is $—(CH_2)_n$— pyridyl, thienyl, naphthylmethyl, or $C_3$–$C_6$ cycloalkyl;
R is $—(CH_2)_n$— pyridyl, thienyl, naphthylmethyl, $C_3$–$C_6$ cycloalkyl, lower alkyl, lower alkynyl lower alkenyl, or trifluoromethyl;
$n$ is 0, 1, 2, or 3;
and the acid addition salts thereof.

Although $n$ may be a number from 0 to 3, it is preferably 0, 1, or 2, and optimal values are 0 or 1.

While the compounds of the present invention have been defined in terms of structural formulas which depict the novel structural features of the claimed compounds and which indicate the presence therein of certain well-known organic radicals, including phenyl, pyridyl, thienyl, and others, it will be recognized by those skilled in the art that such radicals may bear one or more substituents without departing in any way from the spirit of the invention and without altering the properties of the novel compounds in such a way as would set them apart from the invention or take them outside of its scope. Compounds having the novel structure of the present invention and bearing such substituents are accordingly to be considered to lie within the scope of the invention. Among such substituent atoms and radicals are halogen, nitro, lower alkyl, methoxy, ethoxy, methylmercapto, ethylmercapto, trifluoromethyl, lower alkyl—$SO_2$—, lower alkyl—SO—, and the like.

Lower alkyl can be illustratively, methyl, ethyl, n-propyl, isopropyl, n-butyl, isobutyl, sec.-butyl, and tert.-butyl.

Lower alkynyl can be ethynyl, propynyl, and butynyl.
Lower alkenyl can be vinyl, allyl, and butenyl.
Halogen can be illustratively chlorine, bromine, fluorine, and iodine.
Naphthylmethyl can be 1-naphthylmethyl and 2-naphthylmethyl.
$C_3$–$C_6$ cycloalkyl can be illustratively cyclopropyl, cyclobutyl, cyclopentyl, and cyclohexyl.

Compounds coming within the scope of the generic formulas, supra, include, but are not limited to the following:

α,α-bis-(4-inodophenyl)-3-pyridinemethanol
α-(2-fluorophenyl)-α-phenyl-3-pyridinemethanol
α-vinyl-α-phenyl-3-pyridinemethanol
α-(4-bromophenyl)-α-phenyl-3-pyridinemethanol N-oxide
α,α-bis-(4-chlorophenyl)-3-pyridylmethyl acetate
α-phenyl-β-(2-pyridyl)-α-(3-pyridyl)ethyl acetate
α-(4-chlorobenzyl)-α-allyl-3-pyridinemethanol
α-(4-methyl-3-chlorophenyl)-α-(2-thienyl)-3-pyridinemethanol
α-(2-butyenyl)-α-(4-methoxybenzyl)-3-pyridinemethanol
α-(4-iodobenzyl)-α-(4-pyridyl)-3-pyridinemethanol
α,α-bis-(2-phenylethyl)-3-pyridinemethanol,
and the like.

The acid addition salts of the bases represented by the above Formula I can be prepared employing, for example, the following acids: hydrochloric, hydrobromic, sulfuric, phosphoric, nitric, oxalic, methanesulfonic, p-toluenesulfonic, maleic, and the like.

In carrying out the method of the present invention, compositions containing the active ingredient are applied to the infected or susceptible plant surfaces. A convenient and preferred method is to spray the plant surfaces with a liquid dispersion or emulsion of the toxicant.

The compositions of the present invention desirably contain in addition to the substituted pyridine toxicant one or more of a plurality of additaments including water, polyhydroxy compounds, petroleum distillates, and other dispersion media, surface-active dispersing agents, emulsifiers, and finely divided inert solids. The concentration of the substituted pyridine compound in these compositions may vary depending on whether the composition is intended for direct application as a dust to plants or is intended as an emulsifiable concentrate or a wettable powder designed to be subsequently diluted with additional inert carrier such as water to produce the ultimate treating composition.

The compounds of the present invention are applied to plants in effective amounts, varying somewhat with the severity of the fungus infection and with other factors such as the environment in which treatment is conducted. In general, it will be found that an aqueous spray containing from about ½ to about 400 p.p.m. of active material is satisfactory when treatment is to be carried out in the greenhouse.

As is well understood in the art, a somewhat higher concentration of the fungicide is desirable when treatment is to be carried out in the field. In that case, the preferred range is from about 1 to about 600 p.p.m. of active ingredient.

Treating compositions are most conveniently formulated by preparing liquid or solid concentrates which are subsequently diluted to the desired level for use. Emulsifiable liquid concentrates can be prepared by incorporating from about 0.05 to about 5 percent of the active ingredient and an emulsifying agent in a suitable water-immiscible organic liquid. Such concentrates may be further diluted with water to form spray mixtures in the form of oil-in-water emulsions. Such spray compositions than comprise active toxicant, water-immiscible solvent, emulsifying agent, and water. Suitable emulsifying agents can be of the non-ionic or ionic types or blends thereof, and include condensation products of alkylene oxides with phenols and organic acids, polyoxyethylene derivatives of sorbitan esters, complex ether-alcohols, ionics of the aralkyl sulfonate type, and the like. Suitable organic liquids to be employed include aromatic hydrocarbons, aliphatic hydrocarbons, cycloaliphatic hydrocarbons, and mixtures thereof such as petroleum distillates.

Solid concentrate mixtures can be prepared by incorporating from about 10 to about 25 percent of the substituted pyridine compound in finely divided solid carriers such as bentonite, fuller's earth, diatomaceous earth, hydrated silica, diatomaceous silica, expanded mica, talc, chalk, and the like. Such concentrates can be formulated, if desired, for direct use as dust treating compositions, or can be diluted, if desired, with additional inert solid carriers to produce dusting powders containing around 0.05 to 1 percent by weight of the substituted pyridine toxicant. Alternatively, dispersing and/or wetting agents can be incorporated along with the substituted pyridine in the solid carrier to form wettable powder concentrates ranging from 10 to 25 percent concentration which subsequently can be dispersed in water or other aqueous carrier to form spray compositions. Suitable wetting and emulsifying agents include sodium lignosulfate, sulfonate-oxide condensate blends, sulfonate non-ionic blends, anionic wetting agents, and the like.

Further, the substituted pyridine toxicant can be incorporated in solutions, simple dispersions, aerosal formulations, and other media adaptable to be employed for treating vegetation.

In operating according to the method of the present invention, the toxicant composition is applied to infected or susceptible plant surfaces in any convenient fashion such as spraying, dusting, dipping, or drenching. A spray method is considered preferable, especially when large numbers of plants are involved, because of the rapidity and uniformity of treatment possible. In spraying, it is usually sufficient for the infected or susceptible surfaces to be thoroughly wet with the liquid dispersion employed. Good results have been obtained by employing spray compositions whether they be emulsions or aqueous dispersions of solid concentrates.

The following examples illustrate the invention but are not to be construed as limiting.

EXAMPLE 1

The evaluation of the effectiveness of compounds exemplified by the above formulas against *Erysiphe polygoni*, the causative organism of bean powdery mildew, was accomplished in the greenhouse in the following manner.

Fungicidal compositions were prepared by dissolving 40 mg. of the compound to be tested in 1 ml. of a solution of cyclohexanone containing 55 mg. of sulfonate non-ionic blend (Toximul R and S, Stepan Chemical Company, Northfield, Ill.) and diluting to a volume of 100 ml. with water. This composition then contained 400 p.p.m. of fungicide. To prepare a composition containing 1000 p.p.m., 100 mg. of the compound to be tested was dissolved in 1 ml. of the cyclohexanone-sulfonate non-ionic blend solution and then diluted to a volume of 100 ml. with water.

Three bean seeds (Kentucky Wonder variety) were planted in 4-inch clay pots and allowed to germinate, and the plants were thinned to two plants per pot. Ten days from the day of planting, the test chemicals, compounded as described above, were sprayed on all leaf surfaces of the bean plants and allowed to dry. The plants were then placed in the greenhouse and Kentucky Wonder beans heavily infested with powdery mildew were placed above them for about five days, after which they were removed. At the end of five additional days the plants were observed for development of the disease. The appearance of the treated plants was compared with that of untreated plants and ratings of the control of the fungus were recorded. The control rating scale used was as follows:

0—no control
1—slight control
2—moderate control
3—good control
4—complete control, no fungus Chart 1 which follows sets forth the results of the testing of several substituted pyridines against *Erysiphe polygoni*. In the chart, column 1 gives the name of the compound; column 2, the rate in terms of p.p.m. at which the compound was applied to the test plants; and column 3, the protection rating of the compound.

CHART 1

| Compound | Application Rate, p.p.m. | Protection Rating |
|---|---|---|
| α,α-Bis-(3-chlorophenyl)-3-pyridinemethanol. | 400<br>80<br>16<br>3.2 | 4<br>4<br>3.5<br>2 |
| α,α-Bis-(4-chlorophenyl)-3-pyridinemethanol. | 400<br>80<br>16<br>3.2 | 4<br>4<br>4<br>3 |
| α-(4-chlorophenyl)-α-(3-trifluoromethylphenyl)-3-pyridinemethanol. | 400<br>80<br>16<br>3.2 | 4<br>4<br>3.5<br>3+ |
| α,α-Bis-(3-chlorophenyl)-3-pyridinemethanol hydrochloride. | 400<br>80<br>16<br>3.2 | 4<br>4<br>4<br>4 |
| α,α-Bis-(m-tolyl)-3-pyridinemethanol hydrochloride. | 400<br>80<br>16 | 4<br>4<br>2 |
| α-(4-chlorophenyl)-α-(3-trifluoromethylphenyl)-3-pyridinemethanol hydrochloride. | 400<br>80<br>16<br>3.2 | 4<br>4<br>4<br>3+ |
| α,α-Bis-(3-bromophenyl)-3-pyridinemethanol. | 400<br>80<br>16 | 3.5<br>3<br>2 |
| α,α-Bis-(3,4-dichlorophenyl)-3-pyridinemethanol. | 400<br>80 | 3.5<br>2.5 |
| α-(4-chlorophenyl)-α-phenyl-3-pyridinemethanol hydrochloride. | 400<br>80<br>16 | 4<br>4<br>4 |
| α,α-Bis-(p-tolyl)-3-pyridinemethanol. | 400<br>80<br>16 | 4<br>3.75<br>2.5 |
| α-Phenyl-α-(2-thienyl)-3-pyridinemethanol. | 400<br>80<br>16 | 4<br>4<br>2— |
| α,α-Bis-(3-pyridyl)-benzyl alcohol. | 400<br>80<br>16 | 4<br>4<br>2 |
| α,α-Bis-(2-chlorophenyl)-3-pyridinemethanol hydrochloride. | 400<br>80<br>16<br>3.2 | 4<br>4<br>4<br>3.5 |
| α-(4-chlorophenyl)-α-phenyl-3-pyridinemethanol. | 400<br>80<br>16 | 4<br>4<br>4 |

CHART 1—Continued

| Compound | Application Rate, p.p.m. | Protection Rating |
|---|---|---|
| α-Chloro-α,α-bis-(4-chlorophenyl)-3-pyridylmethane hydrochloride. | 400<br>80<br>16 | 4<br>4<br>3+ |
| α,α-Bis-(4-chlorophenyl)-3-pyridinemethylamine dihydrochloride. | 400<br>80<br>16 | 4<br>4<br>4 |
| α-(4-chlorobenzyl)-α-(4-chlorophenyl)-3-pyridinemethanol. | 400<br>80<br>16 | 4<br>4<br>4 |
| α-(3,4-dichlorobenzyl)-α-(4-chlorophenyl)-3-pyridinemethanol. | 400<br>80<br>16 | 4<br>4<br>3 |
| α-(4-chlorobenzyl)-α-phenyl-3-pyridinemethanol. | 400<br>80<br>16<br>3.2 | 4<br>4<br>4<br>1.5 |
| α-(2,4-dichlorobenzyl)-α-(4-chlorophenyl)-3-pyridinemethanol. | 400<br>80<br>16<br>3.2 | 4<br>4<br>4<br>2 |
| α-(1-naphthylmethyl)-α-phenyl-3-pyridine-methanol. | 400<br>80<br>16 | 3.5<br>2.6<br>2.3 |
| α-(x-Bromophenyl)-α-(2,4-dichlorobenzyl)-3-pyridinemethanol. | 400<br>80<br>16<br>3.2 | 4<br>4<br>4<br>3 |
| α-(4-chlorobenzyl)-α-(p-tolyl)-3-pyridine-methanol. | 400<br>80<br>16<br>3.2 | 4<br>4<br>4<br>2.5 |
| α-(4-chlorophenyl)-α-(4-methoxybenzyl)-3-pyridinemethanol. | 400<br>80<br>16 | 4<br>4<br>2.3 |
| α-Phenyl-β-(2-pyridyl)-α-(3-pyridyl)-ethanol. | 400 | 2 |
| α-(4-chlorophenyl)-β-(2-pyridyl)-3-(5-methyl-pyridine)ethanol. | 40<br>80<br>16 | 4<br>3.3<br>1.3 |
| α-(2,4-dichlorobenzyl)-α-(4-chlorophenyl)-3-pyridinemethanol hydrochloride. | 400<br>80<br>16<br>3.2 | 4<br>4<br>4<br>4 |
| α-(2,4-dichlorobenzyl)-α-(4-chlorophenyl)-3-pyridinemethanol methanesulfonate. | 400<br>80<br>16 | 4<br>4<br>3+ |
| α-(4-chlorophenyl)-α-phenethyl-3-pyridine-methanol. | 400<br>80<br>16 | 3<br>3.3<br>2 |
| Nitration product of α-(3-pyridyl)-α,β-diphenyl-ethanol. | 400<br>80<br>16 | 3.5<br>4<br>2 |
| α-(2,4-dichlorobenzyl)-α-(4-chlorophenyl)-3-pyridine-methanol N-oxide. | 400<br>80<br>16 | 3.5<br>4<br>4 |
| α,α-Bis-(4-chlorobenzyl)-3-pyridine-methanol. | 400<br>80<br>16 | 4<br>3<br>2− |
| α,α-Bis-(2,4-dichlorobenzyl)-3-pyridine-methanol. | 400<br>80<br>16 | 3.5<br>4<br>3.5 |
| α-(4-chlorobenzyl)-α-(2,4-dichlorobenzyl)-3-pyridinemethanol. | 400<br>80<br>16 | 4<br>4<br>4 |
| α-Benzyl-α-(2,4-dichlorobenzyl)-3-pyridinemethanol. | 400<br>80<br>16<br>3.2 | 4<br>4<br>3<br>2.5 |
| α,α-Dibenzyl-3-pyridinemethanol. | 400 | 3+ |
| α-(4-chlorophenyl)-α-ethynyl-3-pyridinemethanol. | 400 | 3.5 |
| α-(4-chlorophenyl)-α-phenyl-3-(5-methyl-pyridine)-methanol. | 400<br>80<br>16 | 4<br>2.5<br>1.5 |
| α-(2,4-dichlorobenzyl)-α-(4-chlorophenyl)-3-pyridinemethanol hemioxalate. | 400<br>80<br>16 | 4<br>4<br>4 |
| α,α-Bis-(4-chlorophenyl)-3-pyridylmethyl methyl ether. | 400<br>80<br>16 | 4<br>4<br>4 |

CHART 1—Continued

| Compound | Application Rate, p.p.m. | Protection Rating |
|---|---|---|
| α,α-Bis-(4-chlorophenyl)-3-pyridylmethyl methyl ether hydrochloride. | 400<br>80<br>16 | 4<br>4<br>4 |
| α,α-Bis-(4-chlorophenyl)-3-pyridinemethanol phosphate. | 400<br>80<br>16 | 4<br>4<br>4 |
| α-(4-Methylthiophenyl)-α-phenyl-3-pyridinemethanol hydrochloride. | 400<br>80<br>16 | 4<br>4<br>4 |
| α-(n-Propyl)-α-(2-thienyl)-3-pyridine-methanol. | 400<br>80 | 4<br>3+ |
| α-Trifluoromethyl-α-phenyl-3-pyridine-methanol. | 400<br>80 | 3.5<br>2 |
| α-Ethyl-α-phenyl-3-pyridinemethanol | 400 | 2 |
| α-Methyl-α-phenyl-3-pyridinemethanol | 400 | 2 |

EXAMPLE 2

A field trial was run to determine the efficacy of α,α-bis-(4-chlorophenyl)-3-pyridinemethanol against *Erysiphe cichoracearum*, the causal organism of powdery mildew on squash.

The fungicidal compound was formulated as a 25 percent wettable powder and used at that rate as indicated in Chart 2 which follows.

In addition, α,α-bis-(4-chlorophenyl)-3-pyridinemethanol was formulated as a 0.5% and 2.0% dust, respectively and applied to the growing squash.

Squash, Early Yellow Crookneck variety, were planted in rows 30 feet long. Treatments were applied to alternate rows with the untreated rows acting as guard rows. The spray was applied using a 3-gallon compression sprayer. Dusts were applied using a Hudson crank duster.

The liquid treatments were properly measured and brought up to volume of one gallon and applied to 30 feet of row.

Evaluation of the incidence of the disease was made by two observers using the Barratt-Horsfall rating system.

Results are shown in Chart 2. Column 1 gives the name of the compound; column 2, the rate of the application; and columns 3 and 4, the percent of powdery mildew observed.

CHART 2

| Compound | Application Rate | Incidence of Powdery Mildew, Percent | |
|---|---|---|---|
| | | Rep I | Rep II |
| Control | | 81.25 | 71.87 |
| α,α-Bis-(4-chlorophenyl)-3-pyridinemethanol. | 10 p.p.m., 25% WP | 2.34 | 2.34 |
| Do | 50 p.p.m., 25% WP | 0.0 | 0.0 |
| Do | 600 p.p.m., 25% WP | 0.0 | 0.0 |
| Do | Dust, 0.5% | 0.0 | 0.0 |
| Do | Dust, 2.0% | 0.0 | 0.0 |

The compounds useful in the fungicidal processes of this invention can readily be prepared by one of the following procedures:

One method for synthesis of the tri-substituted methanols is to add a solution of a Grignard reagent to a solution of a suitable organic ketone such as diphenyl ketone, 3-pyridyl phenyl ketone, 2-thienyl phenyl ketone, or the like, at a suitable temperature for a time sufficient to bring about substantial reaction thereof.

For example, the Grignard reagent prepared from p-bromochlorobenzene and magnesium turnings in ether is added to an ether solution of p-chlorophenyl 3-pyridyl ketone and the reaction product mixture is stirred at about room temperature for about 18 hours. The time of reaction can be varied without adversely affecting the yield of the desired product. The reaction product mixture is hydrolyzed in the usual manner with aqueous ammonium chloride. The mixture is extracted with ether, and the ether evaporated in vacuo, leaving a residue which is recrystallized to yield α,α-bis-(4-chlorophenyl)-3-pyridinemethanol.

Alternatively, a solution of the ketone can be added to the Grignard reagent in ether or other suitable solvent. The reaction product mixture is then worked up as described above.

Another preparative method used for the synthesis of the tri-substituted methanols is that taught by Wibaut, et al., Rec. trav. chim., 77, 1057 (1958). According to the Wibaut et al. method, 3-pyridyl lithium, prepared by the reaction in ether of butyl lithium with a 3-halopyridine, is allowed to react in a nitrogen atmosphere with a suitable diaryl ketone or alkyl aryl ketone in ether solution at a temperature of about −50° to −60° C., to yield a pyridyl diaryl methanol.

For example, to 3-pyridyl lithium in ether, maintained in a nitrogen atmosphere at a temperature of −50° to −60° C., is added an ether solution of phenyl 2-thienyl ketone, and the temperature of the reaction mixture held at about −50° to −60° C. while stirring for about two hours. The reaction product mixture is warmed to room temperature and an aqueous solution of ammonium chloride added. The mixture is extracted with ether to obtain an ether solution of the product, which is purified by the acid-base treatment well-known to the art. The desired product, α-(2-thienyl)-α-phenyl-3-pyridinemethanol is obtained as a solid. The hydrochloride salt is conveniently prepared by saturating an ether solution of the free base with anhydrous hydrogen chloride, a method well-known to the art.

Compounds in which R in the above formula is other than hydroxyl, such as amino, halogen, alkoxy, or alkylmercapto, are prepared by standard metathetic reactions with the hydroxyl derivatives. For example, a pyridyl diphenylmethyl chloride can be prepared by treatment of the corresponding methanol with concentrated hydrochloric acid. A pyridyl diphenyl methylamino compound can in turn be prepared from this methyl chloride derivative by reaction with ammonia or an amine. Similarly, the alkoxy and alkylmercapto compounds are readily prepared from the corresponding chloride or bromide.

The pyridine-N-oxides falling within the scope of the generic formula, supra, are conveniently prepared by oxidation of the corresponding free base with hydrogen peroxide in glacial acetic acid solution.

For example, a mixture of α,α-bis-(4-chlorophenyl)-3-pyridinemethanol, glacial acetic acid, and 30 percent hydrogen peroxide is warmed for a couple of hours on the steam bath and allowed to remain overnight at about ambient room temperature. The reaction product mixture is concentrated to dryness in vacuo and the residue recrystallized from boiling benzene to yield α,α-bis-(4-chlorophenyl)-3-pyridiene-N-oxide.

Compounds of the type represented by α,α-bis-(2,4-dichlorobenzyl)-3-pyridinemethanol are conveniently prepared by reaction of a Grignard reagent with a lower alkyl nicotinate or a benzyl pyridyl ketone, the reaction product mixture being worked up in the customary manner with the product being obtained in the form of the free base or in the form of one of the desired acid addition salts.

Compounds exemplified by "Nitration product of α-(3-pyridyl)-α,β-diphenylethanol" are conveniently prepared by standard nitration methods well-known to the art.

Compounds such as α-(4-chlorophenyl)-α-ethynyl-3-pyridinemethanol are prepared by reaction of sodium acetylide with a suitable ketone, in this case, 3-pyridyl-4-chlorophenyl ketone in liquid ammonia with stirring for a couple of hours or so. The excess liquid ammonia is allowed to evaporate and the residue is recrystallized from a suitable solvent to yield the desired product.

Compounds containing the lower alkenyl grouping can be obtained by partial reduction of compounds containing the lower alkynyl grouping, such partial reduction being carried out by methods well-known to the art.

The following examples serve to show the methods for preparing the compounds useful in this invention.

Preparation 1.—α,α-bis-(4-chlorophenyl)-3-pyridinemethanol

A Grignard reagent was prepared from 2.4 g. (0.1 gram-atom) of magnesium turnings and 23 g. (0.12 mole) of p-bromochlorobenzene, using iodine as a catalyst and ether as solvent. The Grignard reagent thus prepared was transferred to a dropping funnel and added dropwise to a solution of 10.8 g. (0.05 mole) of p-chlorophenyl-3-pyridylketone in 100 ml. of dry ether. The reaction product mixture was stirred for about 18 hours at ambient room temperature.

The reaction product mixture was hydrolyzed by adding saturated aqueous ammonium chloride solution with stirring. The ether layer was separated and the aqueous layer was discarded. The ether layer was extracted with dilute aqueous hydrochloric acid. The aqueous acid solution was made basic with concentrated aqueous sodium hydroxide solution, the oily supernatant layer extracted with ether, the ether evaporated, and the residue recrystallized from a mixture of benzene and Skellysolve B to yield α,α-bis-(4-chlorophenyl)-3-pyridinemethanol having a melting point of about 172–174° C.

Analysis.—Calcd.: C, 65.47; H, 3.96; N, 4.24. Found: C, 65.79; H, 4.13; N, 4.14.

A sample of α,α-bis-(4-chlorophenyl)-3-pyridinemethanol was dissolved in dry ether and the solution saturated with gaseous hydrogen chloride. The solid thus obtained was recrystallized from a mixture of ethanol and ether to yield α,α-bis-(4-chlorophenyl)-3-pyridinemethanol hydrochloride having a melting point of about 165–175° C.

Analysis.—Calcd.: C, 58.96; H, 3.84; N, 382. Found: C, 59.05; H, 4.11; N, 3.57.

Other acid addition salts of α,α-bis-(4-chlorophenyl)-3-pyridinemethanol were also prepared and are listed below:

α,α-Bis-(4-chlorophenyl)-3-pyridinemethanol p-toluenesulfonate. Melting point: 146–148° C.

Analysis.—Calcd.: C, 59.76; H, 3.21; N, 2.79. Found: C, 60.36; H, 4.36; N, 2.82.

α,α-Bis-(4-chlorophenyl)-3-pyridinemethanol methanesulfonate. Melting point: 104–108° C.

Analysis.—Calcd.: C, 53.53; H, 4.02; N, 3.29. Found: C, 52.25; H, 4.55; N, 2.90.

α,α - Bis - (4-chlorophenyl)-3-pyridinemethanol sulfate. Melting point: 186–188° C.

Analysis.—Calcd.: C, 50.48; H, 3.53; N, 3.27. Found: C, 50.78; H, 3.75; N, 3.24.

α,α - Bis - (4 - chlorophenyl) - 3-pyridinemethanol phosphate. Melting point: 198–200° C.

Analysis.—Calcd.: C, 50.48; H, 3.77; N, 3.27. Found: C, 50.71; H, 4.06; N, 3.43.

Following essentially the procedure of Preparation 1, the following compounds were prepared:

α-(4-chlorophenyl)-α-phenyl-3(5-methylpyridine)methanol. Melting point: 132° C.

Analysis.—Calcd.: C, 73.66; H, 5.21; Cl, 11.45. Found: C, 73.73; H, 5.33; Cl, 11.00., Diphenyl 3 - pyridinemethanol. Melting point: 117–118° C.

Analysis.—Calcd.: C, 82.73; H, 5.78; N, 5.36. Found: C, 82.77; H, 5.85; N, 5.26.

α,α - Bis - (p-tolyl)-3-pyridinemethanol. Melting point: 128–130° C.

Analysis.—Calcd.: C, 83.01; H, 6.62; N, 4.84. Found: C, 82.96; H, 6.71; N, 4.70.

α,α-Bis-(3,4-dichlorophenyl)-3-pyridinemethanol. Melting point: 155–157° C.

Analysis.—Calcd.: C, 54.17; H, 2.77; N, 3.51. Found: C. 54.23; H, 2.68; N, 3.32.

α-(2,4-dichlorobenzyl)-α-(4-chlorophenyl)-3-pyridinemethanol. Melting point: 174–175° C.
*Analysis.*—Calcd.: C, 60.26; H, 3.72; N, 3.70. Found: C, 60.02; H, 3.85; N, 3.48.

α,α-Bis-(3-chlorophenyl)-3-pyridinemethanol hydrochloride. Melting point: 186–190° C.
*Analysis.*—Calcd.: C, 58.96; H, 3.85; N, 3.82. Found: C, 59.22; H, 4.18; N, 3.66.

α-Benzyl-α-(4-chlorobenzyl)-3-pyridinemethanol. Melting point: 121–123° C.
*Analysis.*—Calcd.: C, 74.19; H, 5.60; N, 4.32. Found: C, 74.12; H, 5.68; N, 4.22.

α - Benzyl - α-(4-chlorobenzyl)-3-pyridinemethanol hydrochloride. Melting point: 180–183° C.
*Analysis.*—Calcd.: C, 66.67; H, 5.31; N, 3.89; Cl, 19.68. Found: C, 66.57; H, 5.56; N, 3.72; Cl, 19.10.

α - (4 - chlorobenzyl) - α - (p-tolyl)-3-pyridinemethanol. Melting point: 163–164° C.
*Analysis.*—Calcd.: C, 74.17; H, 5.61; N, 4.32. Found: C, 73.87; H, 5.68; N, 4.31.

α-(4-chlorophenyl)-α-(4-methoxybenzyl)-3 - pyridinemethanol. Melting point: 149.5–150.5° C.
*Analysis.*—Calcd.: C, 70.69; H, 5.33; N, 4.12. Found: C, 70.41; H, 5.50; N, 3.87.

α-(3-chlorophenyl)-α-(4 - chlorobenzyl)-3 - pyridinemethanol. Melting point: 132–133° C.
*Analysis.*—Calcd.: C, 66.49; H, 4.11; N, 4.08. Found: C, 67.27; H, 4.96; N, 3.79.

α-(3-chlorophenyl)-α-(2,4-dichlorobenzyl)-3 - pyridinemethanol. Melting point: 145–148° C.
*Analysis.*—Calcd.: C, 60.26; H, 3.72; N, 3.70. Found: C, 60.62; H, 3.77; N, 3.60.

α-(2-chlorophenyl)-α-(2,4-dichlorobenzyl)-3 - pyridinemethanol. Melting point: 160–161° C.
*Analysis.*—Calcd.: C, 60.26; H, 3.72; N, 3.70. Found: C, 60.35; H, 3.92; N, 3.40.

α-(4-chlorobenzyl)-α-(2,4-dichlorobenzyl)-3 - pyridinemethanol. Melting point: 154–156° C.
*Analysis.*—Calcd.: C, 61.17; H. 4.10; N, 3.56. Found: C, 61.35; H, 4.28; N, 3.47.

α-(-chlorobenzyl)-α-(2,4-dichlorobenzyl)-3 - pyridinemethanol hydrochloride. Melting point: 198–200° C.
*Analysis.*—Calcd.: C, 55.97; H, 3.99; N, 3.26. Found: C, 56.30; H, 4.16; N, 3.05.

α-Benzyl-α-(2,4-dichlorobenzyl)-3 - pyridinemethanol. Melting point: 133–134° C.
*Analysis.*—Calcd.: C, 67.05; H, 4.78; N, 3.91. Found: C, 67.84; H, 5.11; N, 3.97.

α-(1-naphthylmethyl)-α-phenyl - 3 - pyridinemethanol. Melting point: 223–227° C.
*Analysis.*—Calcd.: C, 76.34; H, 5.57; N, 3.87. Found: C, 76.39; H, 5.76; N, 3.74.

α-(2,4-dichlorobenzyl)-α-phenyl - 3 - pyridinemethanol. Melting point: 134° C.
*Analysis.*—Calcd.: C, 66.29; H, 4.39; Cl, 20.60. Found: C, 66.23; H, 4.69; Cl, 20.64.

α,α-Bis-(4-chlorobenzyl)-3 - pyridinemethanol. Melting point: 125–126° C.
*Analysis.*—Calcd.: C, 67.04; H, 4.78; N, 3.91. Found: C, 67.31; H, 4.91; N, 3.65.

α,α-Bis-(4-chlorobenzyl)-3 - pyridinemethanol hydrochloride. Melting point: 215–218° C.
*Analysis.*—Calcd.: C, 60.85; H, 4.60; N, 3.55. Found: C, 61.13; H, 4.53; N, 3.38.

α-(x-bromophenyl)-α-(2,4-dichlorobenzyl) - 3 - pyridinemethanol. Melting point: 177–178° C.
*Analysis.*—Calcd.: C, 53.93; H, 3.33; N, 3.31. Found: C, 53.90; H, 3.43; N, 3.30.

α-(3-bromobenzyl) - α - (4-chlorophenyl) - 3 - pyridinemethanol. Melting point: 133.5–135° C.
*Analysis.*—Calcd.: C, 58.71; H, 3.88; N, 3.60. Found: C, 58.85; H, 3.92; N, 3.35.

α-(x-bromophenyl)-α - (4-chlorobenzyl - 3 - pyridinemethanol. Melting point: 170–172° C.
*Analysis.*—Calcd.: C, 58.71; H, 3.88; N, 3.60. Found: C, 58.95; H, 4.12; N, 3.55.

α-(4-methoxyphenyl)-α-phenyl - 3 - pyridinemethanol. Melting point: 117.5–119° C.
*Analysis.*—Calcd.: C, 78.66; H, 6.27; N, 4.59. Found: C, 78.59; H, 6.45; N, 4.47.

α-(4-chlorophenyl)-α-(3-,4 - dichlorobenzyl) - 3 - pyridinemethanol. Melting point: 149–150.5° C.
*Analysis.*—Calcd.: C, 60.26; H, 3.73; N, 3.70. Found: C, 60.53; H, 3.80; N, 3.51.

α-(4-chlorobenzyl)-α - phenyl - 3 - pyridinemethanol. Melting point: 116–117° C.
*Analysis.*—Calcd.: C, 73.66; H, 5.20; N, 4.52. Found: C, 73.80; H, 5.25; N, 4.32.

α-Benzyl-α-(4 - chlorophenyl) - 3 - pyridinemethanol. Melting point: 130–131.5° C.
*Analysis.*—Calcd.: C, 73.66; H, 5.20; N, 4.52. Found: C, 73.64; H, 5.28; N, 4.40.

α,α-Bis-(3-bromophenyl)-3 - pyridinemethanol. Melting point: 169–171° C.
*Analysis.*—Calcd.: C, 51.58; H, 3.12; N, 3.34. Found: C, 51.38; H, 3.42; N, 3.24.

The following acid addition salts of α-(2,4-dichlorobenzyl)-α-(4-chlorophenyl) - 3 - pyridinemethanol were prepared using standard methods.

α-(2,4-dichlorobenzyl)-α-(4-chlorophenyl) - 3 - pyridinemethanol hydrochloride. Melting point: 190–195° C.
*Analysis.*—Calcd.: C, 54.97; H, 3.64; N, 3.38. Found: C, 55.20; H, 4.00; N, 3.45.

α-(2,4-dichlorobenzyl)-α-(4-chlorophenyl - 3 - pyridinemethanol phosphate. Melting point: 188–189° C.
*Analysis.*—Calcd.: C, 47.87; H, 3.59; N, 2.94. Found: C, 47.50; H, 3.84; N, 2.84.

α-(2,4-dichlorobenzyl)-α-(4 - chlorophenyl) - 3 - pyridinemethanol hemioxalate. Melting point: 184–186° C.
*Analysis.*—Calcd.: C, 56.68; H, 3.56; N, 3.30; Cl, 25.10. Found: C, 56.37; H, 3.55; N, 3.11; Cl, 24.78.

α-(2,4-dichlorobenzyl)-α-(4 - chlorophenyl) - 3 - pyridinemethanol sulfate. Melting point: 151–152° C.
*Analysis.*—Calcd.: C, 47.85; H, 3.38; N, 2.97. Found: C, 48.62; H, 3.71; N, 2.81.

α-(2,4-dichlorobenzyl)-α-(4 - chlorophenyl) - 3 - pyridinemethanol nitrate. Melting point: 172–174° C.(d).
*Analysis.*—Calcd.: C, 51.67; H, 3.42; N, 6.34. Found: C, 51.65; H, 3.69; N, 6.17.

α-(2,4-dichlorobenzyl)-α-(4 - chlorophenyl) - 3 - pyridinemethanol p-toluenesulfonate. Melting point: 215–217° C.
*Analysis.*—Calcd.: C, 56.69; H, 4.02; N, 2.57. Found: C, 56.91; H, 4.03; N, 2.57.

α-(2,4-dichlorobenzyl)-α-(4 - chlorophenyl) - 3 - pyridinemethanol methanesulfonate. Melting point: 199–202° C.
*Analysis.*—Calcd.: C, 50.60; H, 3.82; N, 2.95. Found: C, 50.54; H, 3.80; N, 2.68.

Preparation 2.—α-(2-thienyl)-α-phenyl-3-pyridinemethanol

To a solution of 54 g. (0.13 mole) of butyl lithium in 100 ml. of ether cooled to a temperature of −60 to −70° C. in a nitrogen atmosphere was added a cooled (−60 to −70° C.) solution of 16 g. (0.1 mole) of 3-bromopyridine in 100 ml. of ether. When the addition was complete, the reaction product mixture was stirred for about one-half hour at the same temperature.

To this solution, maintained at −50 to −60° C. in a nitrogen atmosphere, was added a solution of 18.8 g. (0.1 mole) of phenyl 2-thienylketone in ether, and when addition was complete, the mixture was stirred for about two hours at about −50 to − 60° C.

The reaction product mixture was warmed to room temperature, then mixed with 100 ml. of 10 percent aqueous ammonium chloride solution. The ether layer was separated and the aqueous layer extracted twice with 100-ml. portions of ether. The ether layer and the extracts were combined and extracted with 200 ml. of 1 N aqueous hydrochloric acid. The aqueous acidic solution was cooled, made basic with 50 percent sodium hydroxide solution, and extracted with ether. The ether layer was concentrated to leave a residue which was recrystallized from a mixture of benzene of Skellysolve B to yield α-(2-thienyl)-α-phenyl-3-pyridinemethanol having a melting point of about 117° C.

*Analysis.*—Calcd.: C, 71.89; H, 4.90; N, 5.24. Found: C, 72.14; H, 4.78; N, 4.92.

A sample of α-(2-thienyl)-α-phenyl-3-pyridinemethanol was dissolved in dry ether and the solution saturated in the cold with gaseous hydrogen chloride. The solid material thus obtained was recrystalized from a mixture of ethanol and ether to yield α-(2-thienyl)-α-phenyl-3-pyridinemethanol hydrochloride having a melting point of about 172° C.

*Analysis.*—Calcd.: C, 63.26; H, 4.64; N, 4.61. Found: C, 63.22; H, 4.64; N, 4.50.

Following the same procedures as described in Preparation 2, the following compounds were prepared:

α-(4-chlorophenyl)-α - (3 - trifluoromethylphenyl) - 3-pyridinemethanol. Melting point: 60° C.

*Analysis.*—Calcd.: C, 62.73; H, 3.60; N, 3.85. Found: C, 63.03; H, 3.95; N, 4.22.

α-(4-chlorophenyl)-α - (3 - trifluoromethylphenyl) - 3-pyridinemethanol hydrochloride. Melting point: 130–131° C.

*Analysis.*—Calcd.: C, 57.02; H, 3.53; N, 3.50. Found: C, 57.03; H, 4.06; N, 3.63.

α-Isopropyl - α - phenyl - 3 - pyridinemethanol. Melting point: 128–129° C.

*Analysis.*—Calcd.: C, 79.26; H, 7.54; N, 6.16. Found: C, 79.50; H, 7.87; N, 6.30.

α-Ethyl-α-phenyl - 3 - pyridinemethanol. Melting point: 98–99° C.

*Analysis.*—Calcd.: C, 78.84; H, 7.09; N, 6.57. Found: C, 78.89; H, 7.21; N, 6.37.

α-Trifluoromethyl-α-phenyl-3-pyridinemethanol. Melting point: 127–128° C.

*Analysis.*—Calcd.: C, 61.66; H, 3.98; N, 5.53. Found: C, 61.77; H, 4.05; N, 5.53.

α - (n-Propyl)-α-(2-thienyl)-3-pyridinemethanol. Melting point: 104° C.

*Analysis.*—Calcd.: C, 66.92; H, 6.48; N, 6.00. Found: C, 67.34; H, 6.64; N, 5.89.

α-Methyl-α-phenyl-3-pyridinemethanol. Melting point: 76–77° C.

*Analysis.*—Calcd.: C, 78.37; H, 6.53; N, 7.03. Found: C, 78.02; H, 6.64; N, 6.75.

α,α-Bis-(cyclopropyl)-3 - pyridinemethanol hydrochloride. Melting point: 149° C.

*Analysis.*—Calcd.: C, 63.85; H, 7.14; N, 6.20. Found: C, 63.42; H, 7.35; N, 5.92.

α,α-Bis-(3-chlorophenyl)-3-pyridinemethanol. Melting point: 132–134° C.

*Analysis.*—Calcd.: C, 65.47; H, 3.97; N, 4.24. Found: C, 65.70; H, 4.05; N, 4.32.

α,α-Bis-(3-chlorophenyl) - 3 - pyridinemethanol hydrochloride. Melting point: 176–178° C.

*Analysis.*—Calcd.: C, 58.96; H, 3.84; N, 3.82; Cl, 29.01. Found: C, 59.14; H, 4.04; N, 3.78; Cl, 29.17.

α-(4-methylthiophenyl)-α-phenyl-3 - pyridinemethanol. Melting point: 151–153° C.

*Analysis.*—Calcd.: C, 74.24; H, 5.57; N, 4.55. Found: C, 74.50; H, 5.82; N, 4.55.

α-(4-methylthiophenyl)-α-phenyl-3 - pyridinemethanol hydrochloride. Melting point: 164–166° C.

*Analysis.*—Calcd.: C, 66.55; H, 4.99; N, 4.09. Found: C, 66.56; H, 5.23; N, 3.85.

α,α-Bis-(3-pyridyl)benzyl alcohol. Melting point: Very hygroscopic.

*Analysis.*—Calcd.: C, 77.84; H, 5.38; N, 10.64. Found: C, 79.64; H, 5.87; N, 10.30.

α-(4-chlorophenyl)-α-phenyl-3-pyridinemethanol. Melting point: 102° C.

*Analysis.*—Calcd.: C, 73.10; H, 4.77; N, 4.73. Found: C, 73.01; H, 4.93; N, 4.50.

α-(4-chlorophenyl)-α-phenyl - 3 - pyridinemethanol hydrochloride. Melting point: 175–176° C.

*Analysis.*—Calcd.: C, 65.08; H, 4.55; N, 4.21. Found: C, 65.17; H, 4.57; N, 4.17.

α - (4-chlorophenyl)-α-cyclopropyl-3-pyridinemethanol. Melting point: 83–85° C.

*Analysis.*—Calcd.: C, 69.36; H, 5.43; N, 5.39. Found: C, 69.88; H, 5.63; N, 5.60.

α-(4-chlorophenyl)-α-cyclopropyl - 3 - pyridinemethanol hydrochloride. Melting point: 146° C.

*Analysis.*—Calcd.: C, 60.83; H, 5.10. Found: C, 60.68; H, 5.10.

α-Cyclobutyl-α-phenyl - 3 - pyridinemethanol. Melting point: 125–126° C.

*Analysis.*—Calcd.: C, 80.31; H, 7.15; N, 5.85. Found: C, 80.56; H, 7.26; N, 5.86.

Other acid addition salts of α-(4-chlorophenyl)-α-phenyl-3-pyridinemethanol were prepared by methods well known in the art and are listed below:

α-(4-chlorophenyl) - α - pyridinemethanol phosphate. Melting point: 183–185° C.

*Analysis.*—Calcd.: C, 54.90; H, 4.35; N, 3.56. Found: C, 54.79; H, 4.55; N, 3.39.

α-(4-chlorophenyl)-α-phenyl-3-pyridinemethanol oxalate. Melting point: 137–140° C. (dec.).

*Analysis.*—Calcd.: C, 67.26; H, 4.18; N, 3.63. Found: C, 67.21; H, 4.35; N, 3.66.

Preparation 3.—α-chloro-α,α-bis-(4-chlorophenyl)-3-pyridylmethane hydrochloride

A mixture of 4 g. (0.013 mole) of α,α-bis-(4-chlorophenyl)-3-pyridinemethanol, 50 ml. of dry benzene, and 10 ml. of oxalyl chloride was warmed slightly on a steam bath and allowed to remain overnight at ambient room temperature. The reaction product mixture was again warmed on a steam bath for about 15 minutes and concentrated in vacuo to dryness. The residue was flushed with dry benzene three times, the benzene being removed in vacuo each time. The white solid residue thus obtained was recrystallized from a mixture of benzene and Skellysolve B to yield α-chloro-α,α-bis-(4-chlorophenyl)-3-pyridylmethane hydrochloride having a melting point of about 116 to 117° C. Yield: 4.2 g.

*Analysis.*—Calcd.: C, 56.13; H, 3.40; N, 3.64. Found: C, 56.64; H, 4.12; N, 4.00.

Preparation 4.—α,α-bis-(4-chlorophenyl)-3-pyridinemethylamine dihydrochloride

A solution of 2 g. (0.0052 mole) of α-chloro-α,α-bis-(4-chlorophenyl)-3-pyridylmethane hydrochloride in 100 ml. of dry benzene was saturated with gaseous ammonia and the closed reaction vessel was held at ambient room temperature for about 48 hours. The reaction product mixture was warmed for about one-half hour on the steam bath and evaporated in vacuo to dryness. The residue was dissolved in dry benzene and the solution saturated with anhydrous gaseous hydrochloric acid and concentrated in vacuo. The residue was recrystallized from a mixture of benzene and Skellysolve B to yield α,α-bis - (4 - chlorophenyl)-3-pyridinemethylamine dihydrochloride having a melting point of about 225° C. The product was identified by analysis and physical chemical measurements. pKa=3. AMW=417, theory=402. Yield: 2.3 g.

*Analysis.*—Calcd.: C, 53.76; H, 4.01; N, 6.97. Found: C, 54.64; H, 4.41; N, 6.39.

Preparation 5.—α,α-bis-(4-chlorophenyl)-3-pyridinemethanol N-oxide

A mixture of 10 g. (0.03 mole) of α,α-bis-(4-chlorophenyl)-3-pyridinemethanol, 200 ml. of glacial acetic acid, and 20 ml. of 30 percent hydrogen peroxide was heated on a steam bath for about two hours during which time the pale yellow reaction mixture became colorless. It was allowed to remain overnight at ambient room temperature and then concentrated in vacuo to dryness. The solid residue was recrystallized from boiling benzene (after charcoal treatment) to yield α,α-bis-(4-chlorophenyl)-3-pyridinemethanol N-oxide in the form of white crystals having a melting point of about 140° C. Yield: 9 g.

*Analysis.*—Calcd.: C, 62.45; H, 3.78; N, 4.05. Found: C, 62.70; H, 3.96; N, 3.77.

Using the same procedure as in Preparation 5, the following compound was prepared.

α-(2,4-dichlorobenzyl) - α - (4 - chlorophenyl)-3-pyridinemethanol N-oxide. Melting point: 159–160° C.

*Analysis.*—Calcd.: C, 57.82; H, 3.58; N, 3.55. Found: C, 57.38; H, 4.19; N, 3.41.

Preparation 6.—α-phenyl-β-(2-pyridyl)-α-(3-pyridyl)ethanol

A solution of sodamide was prepared by adding 5 g. (0.217 gram-atom) of sodium to about 300 ml. of liquid ammonia. To this stirred solution was added 36.6 g. (0.2 mole) of 3-benzoylpyridine dissolved in 100 ml. of tetrahydrofuran. The ammonia was evaporated and the red reaction mixture was refluxed for about 3 hours and allowed to remain overnight at ambient room temperature.

The red reaction product mixture was concentrated to dryness in vacuo, the residue dissolved in 200 ml. of aqueous 10 percent hydrochloric acid solution, filtered, and the aqueous acidic solution made basic with aqueous 50 percent sodium hydroxide solution, precipitating a solid. The solid was recrystallized from hot benzene to yield α-phenyl-β-(2-pyridyl)-α-(3-pyridyl)ethanol having a melting point of about 238–239° C.

Analysis.—Calcd.: C, 78.23; H, 5.84; N, 10.14. Found: C, 78.08; H, 5.91; N, 10.00.

Using the same procedure as in Preparation 6, the following compounds were prepared:

α-Phenyl-α-(3-pyridyl)-β-(4-pyridyl)ethanol. Melting point: 132° C.

*Analysis.*—Calcd.: C, 78.23; H, 5.85; N, 10.14. Found: C, 78.37; H, 6.12; N, 10.03.

α-(4-chlorophenyl)-α-(3-pyridyl) - β - (2-pyridyl)ethanol. Melting point: 101° C.

*Analysis.*—Calcd.: C, 69.56; H, 4.86; N, 9.01. Found: C, 69.16; H, 5.51; N, 8.89.

α-(4-chlorophenyl)-α-(5-methyl-3-pyridyl)-β-(2 - pyridyl)ethanol. Melting point: 131° C.

*Analysis.*—Calcd.: C, 70.25; H, 5.27; N, 8.62. Found: C, 70.81; H, 5.77; N, 8.43.

Preparation 7.—α,α-bis-(2,4-dichlorobenzyl)-3-pyridinemethanol hydrochloride

A Grignard reagent was prepared from 4.6 g. (0.19 gram-atom) of magnesium turnings and 39 g. (0.2 mole) of 2,4-dichlorobenzyl chloride in 200 ml. of dry ether. The Grignard reagent was transferred to a dropping funnel and added drop-wise at room temperature with stirring to a solution of 7.5 g. (0.05 mole) of ethyl nicotinate in 100 ml. of dry ether. A yellow suspension formed in the reaction flask during the addition, and the reaction product mixture was gently refluxed for another hour after addition was completed.

To the reaction product mixture was added a saturated aqueous solution of ammonium chloride with stirring. The ether layer was separated, dried, and saturated with anhydrous chloride gas. The precipitate which separated was filtered off and recrystallized from a mixture of ethanol and ether to yield α,α-bis-(2,4-dichlorobenzyl)-3-pyridinemethanol hydrochloride having a melting point of about 200 to 205° C.

*Analysis.*—Calcd.: C, 51.81; H, 3.47; N, 3.02. Found: C, 51.69; H, 3.69; N, 2.89.

Preparation 8.—α,α-bis-(4-chlorophenyl)-3-pyridylmethyl methyl ether

A solution of 5 g. (0.0152 mole) of α,α-bis-(4-chlorophenyl)-3-pyridinemethanol in 25 g. of concentrated sulfuric acid was prepared and added drop-wise to 60 ml. of cold methanol, the temperature being held at about 0° C. during the addition. As soon as the addition was completed, the reaction product mixture was poured into a mixture of sodium hydroxide and ice. The resulting mixture was extracted with ether, and the ether extracts were washed with water, dried, and concentrated in vacuo to yield a viscous yellow oil.

The oil was dissolved in dry ether and the solution saturated with anhydrous hydrogen chloride. The amorphous material which precipitated was filtered off and identified by analysis and n.m.r. spectrum.

*Analysis.*—Calcd.: C, 59.93; H, 4.24; N, 3.68. Found: C, 59.52; H, 4.61; N, 3.82.

Preparation 9.—Nitration product of 1-(3-pyridyl)-1,2-diphenylethanol

To a stirred mixture of 20 ml. of concentrated sulfuric acid and 18 ml. of concentrated nitric acid cooled to room temperature was added in 1 ml. portions a solution of 5 g. (0.018 mole) of 1-(3-pyridyl)-1,2-diphenylethanol in glacial acetic acid. The temperature of the reaction mixture was controlled by placing the flask in a pan of cold water. When the addition was completed, the reaction product mixture was heated at a temperature of about 45° C. for about 30 minutes and then stirred overnight at ambient room temperature.

The reaction product mixture was poured into ice, and the yellow gummy precipitate was dissolved in chloroform and discarded. The aqueous layer was made basic with dilute sodium hydroxide solution and extracted with ether. The ether solution was dried, concentrated in vacuo to dryness, and the crude product submitted for testing.

Preparation 10.—α-(4-chlorophenyl)-α-ethynyl-3-pyridinemethanol

To sodium acetylide, prepared by passing acetylene gas into liquid ammonia while simultaneously adding 6 g. (0.261 gram-atom) of sodium in small portions, was added dropwise a solution of 7 g. (0.0321 mole) of 3-pyridyl-4-chlorophenyl ketone in 100 ml. of ether. The reaction product mixture was stirred for about two hours. The excess ammonia was allowed to evaporate, and 100 ml. of ether and 50 ml. of water added to the residue. The ether layer was separated, dried, and concentrated in vacuo. The residual oil was recrystallized from a mixture of benzene and methylcyclohexane to yield α-(4-chlorophenyl) - α - ethynyl-3-pyridinemethanol having a melting point of about 111–112° C.

*Analysis.*—Calcd.: C, 69.00; H, 4.13; N, 5.75. Found: C, 69.18; H, 4.48; N, 5.49.

I claim:
1. A method for protecting plants from attack by phytopathogenic fungi which comprises contacting a fungus-susceptible plant with a fungicidal amount of a substance having one of the following formulas:

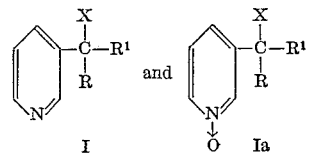

wherein
X is hydroxyl, halogen, amino, acetoxy, lower alkoxy or lower alkyl mercapto;
$R^1$ is

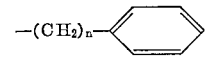

pyridyl, thienyl, naphthylmethyl, or $C_3$-$C_6$ cycloalkyl;

R is

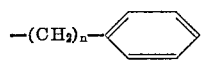

pyridyl, thienyl, naphthylmethyl, $C_3$-$C_6$ cycloalkyl, lower alkyl, lower alkynyl, lower alkenyl, or trifluoromethyl; n is 0, 1, 2, or 3; and the acid addition salts thereof.

2. The method of claim 1 wherein said substance is applied in combination with an inert diluent.

3. The method of claim 1 wherein said substance is applied in combination with an inert diluent and a wetting agent.

4. The method of claim 1 wherein said substance is applied in a composition containing within the range of about ½ to about 600 p.p.m. of fungicidally active material.

5. The method of claim 1 wherein α-(2,4-dichlorobenzyl) - α - (4-chlorophenyl)-3-pyridinemethanol is the fungicidally active substance.

6. The method of claim 1 wherein α,α-bis-(3-chlorophenyl)-3-pyridinemethanol hydrochloride is the fungicidally active substance.

7. The method of claim 1 wherein α-(4-chlorobenzyl)-α-(2,4-dichlorobenzyl)-3-pyridinemethanol is the fungicidally active substance.

8. The method of claim 1 wherein α,α-bis(4-chlorophenyl)-3-pyridinemethanol is the fungicidally active substance.

References Cited
UNITED STATES PATENTS 2,727,895   12/1955   Sperber et al. _____ 260—290

LEWIS GOTTS, *Primary Examiner.*

S. K. ROSE, *Assistant Examiner.*